June 27, 1967   J. D. MALLORY   3,328,042
DECORATING CHUCK
Filed Dec. 7, 1964

INVENTOR.
JAMES D MALLORY
BY
ATTORNEYS

United States Patent Office 3,328,042
Patented June 27, 1967

3,328,042
DECORATING CHUCK
James D. Mallory, Maumee, Ohio, assignor to Owens-Illinois, Inc., a corporation of Ohio
Filed Dec. 7, 1964, Ser. No. 416,530
3 Claims. (Cl. 279—3)

This invention relates to a glassware decorating chuck. More specifically, this invention relates to a chuck for holding and supporting open mouth glassware having what is termed a reverse taper or wherein the chuck cannot enter the open end of the ware and grip the side of the ware.

In the past, decorating chucks for holding tumblers during silk screen decoration of the outer wall of the tumbler involved chucks which entered the open mouth of the tumbler and would grip the side wall of the tumbler in some manner. In those situations where the side wall of the tumbler was of such a configuration that it could not be gripped by a chuck entering the open mouth of the tumbler and engaging the side walls, it was extremely difficult to decorate this type of ware on an automatic screen decorating machine.

The present invention has for its objects the provision of a chucking apparatus which will hold and support glassware in which the side wall of the ware has a reverse taper or is of such a configuration that chuck mechanism which is normally used by the present day screen decorating machines is incapable of holding the ware.

A further object of this invention is to provide a tumbler chuck which will receive ware having a larger intermediate diameter than the upper opening and hold such ware during automatic screen decoration.

It is a still further object of this invention to provide a chuck for holding and supporting glassware wherein the entire side wall and bottom of the ware is free to receive a decoration.

Other and further objects will become apparent from the following description taken in conjunction with the annexed sheet of drawings, wherein.

Figure 1:
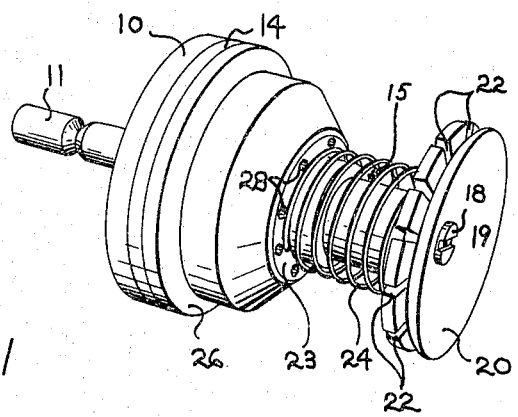
FIG. 1 is a perspective view of the glassware chuck of the invention.

The decorating chuck of the present invention is intended to be used for the holding and supporting of open mouth glassware in a decorating machine of the type disclosed in U.S. Patent 2,885,857 issued May 12, 1959. As can be seen when viewing FIG. 1 of said patent, the two chucks 25 are of a type which are inserted through the mouth of the ware and will grip the inside wall of the ware.

The present invention will now be described in detail with reference to the drawings.

The ware chuck comprises a plate 10 having a central opening therethrough within which a mounting stem 11 is attached. The stem 11 extends through the opening in the plate 10 and is retained therein by retaining rings 12 and 13. The stem 11 is hollow and serves to provide a means to evacuate the forward area of the plate 10.

An annular member 14 is fixed to the face of the plate 10 and serves to form a guide and support for a cylindrical member 15 which rides within the central opening of the member 14 much as a piston rides in a cylinder.

The cylindrical member 15 has the general form and appearance of a piston with a sleeve or skirt portion 16 thereof slidable in the opening in the annular member 14.

Figure 2:
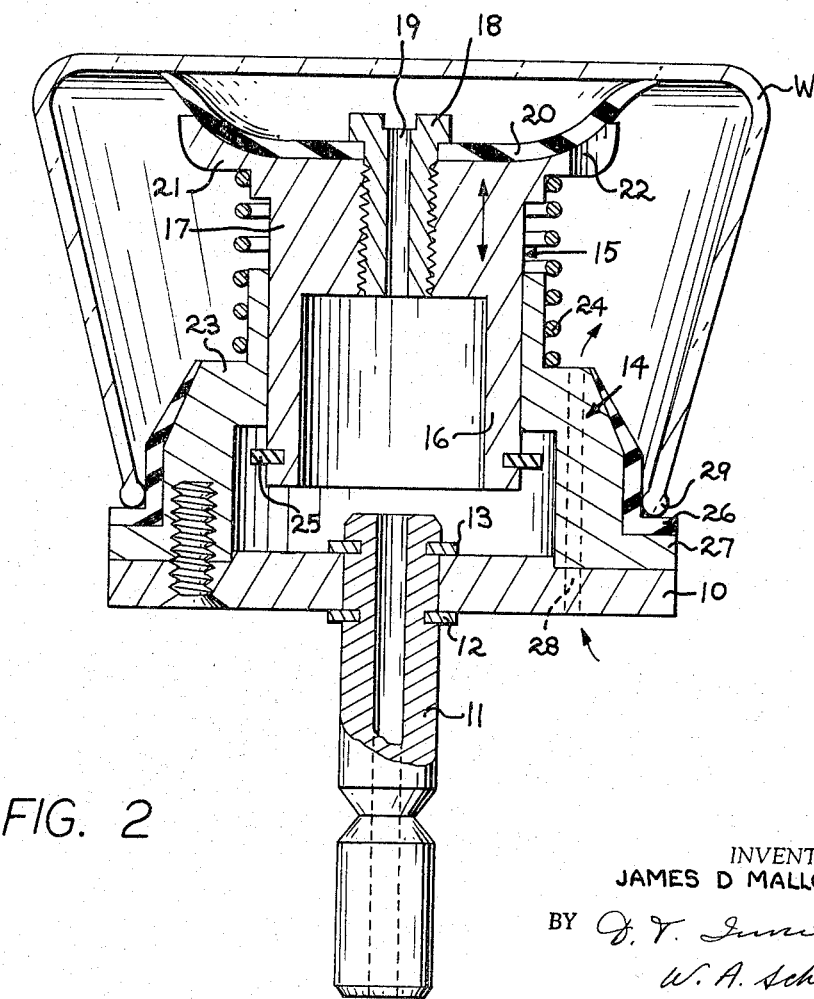
FIG. 2 is a cross-sectional view, on a somewhat enlarged scale, of the chuck of FIG. 1.

The head portion 17 of the cylindrical member 15 is provided with an opening extending axially therethrough within which a screw 18 is threaded. The screw 18 has a passage 19 extending axially thereof. The outer surface of the head portion 17 of the cylindrical member 15 has a concave configuration which serves as the back-up and supporting surface for a flexible seal cup 20. As can readily be seen when viewing FIG. 2, the seal cup 20 is retained by the screw 18 on the head portion 17 of the cylindrical member 15.

The head portion 17 of the cylindrical member 15 is formed with a shoulder portion 21 of larger diameter than the diameter of the sleeve portion 16. The shoulder portion 21 is provided with a plurality of slots 22, whose purpose will be later described.

The annular member 14 is formed with a first shoulder 23 against which the lower end of a helical spring 24 is seated. The upper end of the helical spring is seated against the shoulder portion 21 of the cylindrical member 15. In this manner the spring biases the cylindrical member 15 outwardly of the annular member 14. A retaining ring 25 carried by the sleeve portion 16 of the cylindrical member 15 prevents the member 15 from sliding out of the annular member 14.

The annular member 14 is provided with a surrounding plastic or rubber-like material 26 which covers a frustoconical portion of the annular member 14 and the lower shoulder portion 27 of the annular member 14. The resilient material 26 serves to protect ware which is to be carried by the chuck from contact with the metal parts of the chuck, it being readily understood that the ware, when applied to the chuck, will have its bead edge held in contact with the material 26, particularly that portion which covers the shoulder portion 27 of the annular member 14.

A plurality of passages 28 extend through the plate 10 and the annular member 14 thus providing atmospheric communication with the area surounding the member 14 and 15. The operation of the chuck is as follows: a piece of ware W is moved telescopically over the end of the chuck and the cup 20 will engage the bottom of the ware. A source of vacuum which may be continuously applied to the stem 11 causes evacuation of the chamber within the annular member 14 and also within the sleeve portion of the cylindrical member 15.

The vacuum also will communicate through the passage 19 to the area defined by the bottom wall of the tumbler and the seal cup 20. In this manner the ware is held in contact with the cup 20, it being understood that the vacuum formed within the cup 20 permits the atmospheric pressure acting on the bottom of the ware to hold the ware against the cup. At the same time, the cup 20 will have atmospheric pressure acting on the outer rim portion due to the fact that its diameter, when applied to the ware, is larger than the shoulder portion 21 of the cylindrical member 15 and also the slots 22 ensure that a considerable area of the back side of the cup 20 is exposed to atmospheric pressure. Additionally, the vacuum within the area defined by the sleeve portion 16 sets up a condition wherein the atmospheric pressure acting on the bottom of the ware in the area opposite to the area defined by the cup engagement will cause the cylindrical member 15 to be retracted against the bias pressure of the spring 24 until the ware bead edge engages the covered shoulder 27 of the annular member 14. With the vacuum maintained within the chuck, the ware may be moved through the required decorating operations as carried out on the automatic screen decorating machine of the type shown in U.S. Patent No. 2,885,957.

Since atmospheric pressure will enter through the passages 28 to the interior of the ware, there is no requirement of a seal between the bead 29 of the ware and the covered shoulder 27. After the ware has been decorated, it is only necessary to release the vacuum and the ware may be readily removed from the chuck.

By providing the foregoing apparatus, which utilizes the vacuum cup or seal cup arrangement which engages the bottom of the ware, applicant has provided an apparatus which may hold and support ware for decorating which is superior in operation to the presently utilized ware chucks, in that it is capable of holding ware which present chucks are unable to hold and permits decorating ware which has a so-called reverse taper wall construction in relation to the open end of the ware.

While the present apparatus is disclosed as being used to hold a piece of ware having a relatively short side wall length, it should be readily understood that merely by changing the dimensions of the various parts, the chuck would be capable of holding ware having much longer and different side wall configurations, it only being necessary that there is an area at the bottom of the ware which the vacuum sealing cup 20 may engage.

Various modifications may be resorted to within the spirit and scope of the appended claims.

I claim:

1. Apparatus for supporting hollow articles internally comprising, a circular plate, a hollow stem connected to and extending through an opening in said plate, an annular guide member fixed to one side of said plate, said member having a radial flange adjacent the plate for seating the opening defining surface of the article thereon, a cylindrical member having a portion thereof extending into said annular member and mounted for axial, sliding movement relative thereto, said cylindrical member having a concave, outer end wall, spring means acting between said members for urging said members apart, means carried by one of said members for limiting the relative movement thereof, a concave, flexible seal cup seated in the outer end wall of said cylindrical member, means securing said cup to said end wall, said securing means having a passage therethrough for communicating the interior of said cup with the interior of said annular member, means for applying vacuum to the passage of the securing means for evacuating said seal cup and seating the article in supported position thereon, and means formed in said plate and said annular member for communicating the atmosphere with the outside of said annular member when a hollow article is positioned therearound.

2. The apparatus as defined in claim 1, wherein the concave outer end wall of said cylindrical member extends outwardly in the form of a flange which embraces said seal cup and said flange portion has spaced-apart slots formed therethrough.

3. A glassware holding and supporting chuck comprising, an annular guide, a plate secured to and closing one end of said guide, a cylindrical member having a sleeve portion thereof slidably received in said annular guide, a flexible seal cup secured to the outer end wall of said cylindrical member and adapted to engage the inner bottom surface of a piece of glassware inserted thereover, an outwardly tapered, external shoulder formed on said annular guide adapted to guide the open end of the ware with respect thereto, an annular shoulder flange formed on said guide against which the bead surface of the ware is adapted to be seated, compression spring means positioned between said guide and said member, said member having an axial passage formed therethrough which opens into the center of said seal cup, a vent passage through said plate communicating between the radial exterior of said guide member and the interior of the ware and connected to atmosphere, and means extending through said plate for applying a vacuum to the interior of said guide and seal cup.

References Cited

UNITED STATES PATENTS

| 1,384,278 | 6/1921 | Slocombe | 51—235 |
| 1,688,424 | 10/1928 | Kiefer | 279—3 X |
| 2,529,331 | 11/1950 | Ellis | 279—3 X |
| 2,997,914 | 8/1961 | Kopkins | 279—3 X |

ROBERT C. RIORDON, *Primary Examiner.*

ERNEST A. CARPENTER, H. V. STAHLHUTH,
*Assistant Examiners.*